(12) United States Patent
Lee et al.

(10) Patent No.: US 7,400,963 B2
(45) Date of Patent: Jul. 15, 2008

(54) SPEED CONTROL METHOD FOR VEHICLE APPROACHING AND TRAVELING ON A CURVE

(75) Inventors: Yong H. Lee, Troy, MI (US); Weiwen Deng, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 245 days.

(21) Appl. No.: 11/297,906

(22) Filed: Dec. 9, 2005

(65) Prior Publication Data

US 2007/0150157 A1    Jun. 28, 2007

(51) Int. Cl.
*B60T 8/24* (2006.01)
*B60T 8/58* (2006.01)
*G01C 21/30* (2006.01)

(52) U.S. Cl. .......................... 701/93; 701/72; 701/208; 180/171

(58) Field of Classification Search ............. 701/93–97, 701/200, 207, 208; 180/170–171, 176, 179
See application file for complete search history.

(56) References Cited

U.S. PATENT DOCUMENTS

| | | | |
|---|---|---|---|
| 6,092,014 A * | 7/2000 | Okada | 701/70 |
| 6,577,937 B1 * | 6/2003 | Shuman et al. | 701/48 |
| 6,836,719 B2 * | 12/2004 | Andersson et al. | 701/93 |
| 7,266,438 B2 * | 9/2007 | Kellum et al. | 701/93 |
| 2007/0208485 A1 * | 9/2007 | Yamamura et al. | 701/93 |

* cited by examiner

*Primary Examiner*—Thomas G. Black
*Assistant Examiner*—Shelley Chen

(57) ABSTRACT

A vehicle curve speed control system (10) adapted for use with a vehicle (12) having an operator (14), includes a map database (16) representing a current vehicle path, and a locator device (20) communicatively coupled to the database (16) and configured to determine the location of the vehicle (12) on the path. The system (10) further includes a controller (36) configured to identify approaching curve points of a curve (18$a$) in terms of curvature or radius, and determine a desired speed profile based on operator preference and/or vehicle characteristic input. An acceleration profile is determined, based on the current vehicle speed, and desired speed profile. An acceleration/deceleration command at the present control loop is modified towards achieving an optimal curve speed, and is delivered to either a brake or acceleration module (40,42) to automatically accelerate or decelerate the vehicle (12) accordingly.

16 Claims, 5 Drawing Sheets

SPEED CONTROL METHOD FOR VEHICLE APPROACHING AND TRAVELING ON A CURVE

BACKGROUND OF THE INVENTION

1. Technical Field

The present invention relates to curve speed control systems, and more particularly to a speed control system configured to facilitate proper operator management of the curve by accelerating or decelerating the vehicle automatically.

2. Background Art

Particularly with respect to automobiles, operator mismanagement of a curve is one of the most prevalent factors contributing to accidents. In these accidents, it is appreciated that excessive lateral forces result when the rate of speed of the vehicle exceeds the rate of speed at which the vehicle could safely or comfortably manage the curve. It is further appreciated that when approaching a curve at excessive speeds the operator typically begins a precarious cycle of excessive braking and steering to resolve the cornering difficulties.

Historically, licensed civil engineers have designed thoroughfare curves by selecting one of a plurality of curve templates, i.e. circular, spiral, and more likely a combination of both, that best fits existing terrain and avoids obstructions for which removal is deemed too costly. The beginning of the curve is typically set at a given station and further indicia, such as the curve beginning and ending radius, is also typically noted on the plans. Computer aided design techniques and software provide cross-sections at typical station offsets, wherein elevation points and bank angles for the curve are represented. These plans are precisely staked and constructed in the field by survey and construction crews. Finally, the thoroughfare speed limit is determined, such that a typical driver and vehicle combination producing a minimal normal force, and lateral coefficient of friction with the surface, is capable of withstanding the lateral acceleration caused by centrifugal force acting upon the vehicle.

More particularly, centrifugal force, $F_c(=ma_c=mv^2/R)$, acts upon the vehicle during curve management to effect a laterally outward acceleration. To maintain the curve, i.e. constant radius, of the vehicle path, this force must be directly proportional to an equal and opposite centripetal force. With respect to automobile travel, the force of friction between the tires and the road surface provides centripetal force. To accommodate for conditions where friction is insufficient (e.g., on wet roads, ice, oil, etc.), the curve is preferably banked at an angle, $\theta$, so that at least a portion of the centripetal force is provided instead by a normal force, $F_N$ ($=mg$). Equating $F_c$ and $F_N$ on a normal road condition where friction is assumed to be 1, the maximum allowable velocity is related to gravity by: $v^2=g R \tan \theta$, where g is the acceleration due to gravity, and R is the radius of curvature.

Thus, when a vehicle is speeding and friction is insufficient, it is often difficult for an operator to safely maneuver around a curve. To address curve mismanagement, systems have been developed to either identify an approaching curve or modify some aspect of the vehicle performance during or approaching the curve. Some of these systems present mechanisms and control logic for selecting and achieving an optimal transmission gear during curve management, and defining and estimating an approaching curve. Other systems determine stable running speeds for detected nodes and decelerate or accelerate the vehicle, so as to achieve the stable speed at a given point.

These conventional systems, however, are rigid one-size-fits-all models that do not enable modifications due to operator preference or vehicle characteristics. These systems also do not provide means for properly addressing special conditions that may modify an allowable curve speed profile where desired. Of yet further concern, these systems do not accommodate an instantaneous change in curvature radius that may occur at a circular curve termination point, nor provide feedback to enable the optimization of performance, and therefore may result in errors or rapid acceleration when exiting a curve.

DISCLOSURE OF INVENTION

Responsive to these and other concerns caused by conventional curve speed control systems, the present invention concerns an improved curve speed control system that utilizes refining factors to improve operator curve management. Among other things, the system reduces the vehicle speed when approaching a curve if necessary, which will eliminate excessive braking by the operator on the curve and thereby reduces steering effort and the risk of accident. The inventive system is also smart enough to accelerate toward the end of the curve so that cornering performance is improved.

A first aspect of the present invention concerns a speed control system adapted for use with a vehicle having a steering wheel and an operator. The system includes a map database having at least one record, wherein the record presents at least one path. The path presents a plurality of position points, wherein a portion of the points present adjacent curve points that define a curve. A locator device is communicatively coupled to the database, and configured to determine the location of the vehicle and match the location with a first of said points on the path. The system further includes a controller communicatively coupled to the device and database. The controller is configured to identify an approaching curve point and determine an allowable curve point management speed. Finally, the controller is further configured to determine a desired curve point management speed based in part on the allowable curve point management speed and an operator preference and/or vehicle characteristic input.

A second aspect of the present invention concerns a method of vehicular curve management by a controller, wherein the vehicle includes a navigation system having a map database. The method includes accessing and locating the current position of the vehicle upon a path in the database. An approaching curve point of a curve on the path is identified. A curve point radius and an allowable curve point management speed are determined. An input relating to an operator preference or vehicle characteristic is received. Finally, a desired curve point management speed based on the allowable curve point management speed and input is determined. More preferably, the system further produces an acceleration or deceleration command based on a pre-determined acceleration profile, and provides constant feedback under a control loop, so as to optimize the command.

It will be understood and appreciated that the present invention provides a number of advantages over the prior art, including, for example, providing a more flexible user-specified system. The system is configured to achieve an optimal curve speed following based on accurate road sensing capability, desired speed computation, and control strategy. The system is communicatively coupled to the vehicle, so as to continuously receive sensory feedback, and facilitate automatic curve speed control by the vehicle.

Other aspects and advantages of the present invention will be apparent from the following detailed description of the preferred embodiment(s) and the accompanying drawing figures.

BRIEF DESCRIPTION OF DRAWINGS

A preferred embodiment of the invention is described in detail below with reference to the attached drawing figures, wherein.

MODES FOR CARRYING OUT THE INVENTION

Figure 1:
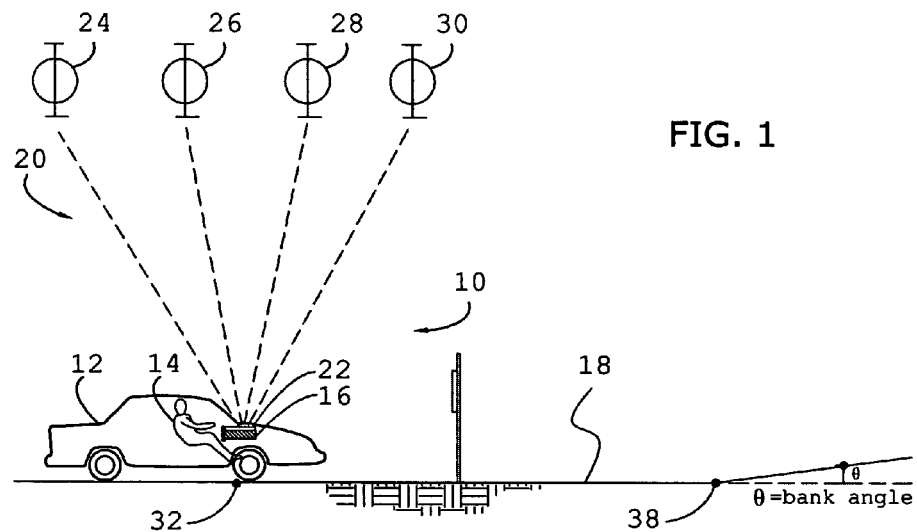
FIG. 1 is a plan view of a vehicle in accordance with the present invention, particularly illustrating components of a preferred curve speed control system.

As shown in FIG. 1, the present invention concerns an improved curve speed control system 10 adapted for use with a vehicle 12 and by an operator 14. The system 10 is configured to identify a plurality of curve points (i.e., nodes), each preferably equidistance from the edge of pavement, of an approaching curve. As further described herein, the system 10 is configured to determine an allowable (i.e., critical or maximum range) curve speed profile, determine a vehicle condition, such as yaw rate, speed and geographic location, and determine a desired curve speed profile based on the allowable curve speed profile and an operator preference or vehicle characteristic input. The system 10 is illustrated and described herein with respect to vehicles such as cars, SUV's, trucks, etc. However, it may also be utilized with airborne and watercraft machines, or whenever navigation and curve management are desired.

Figure 2:
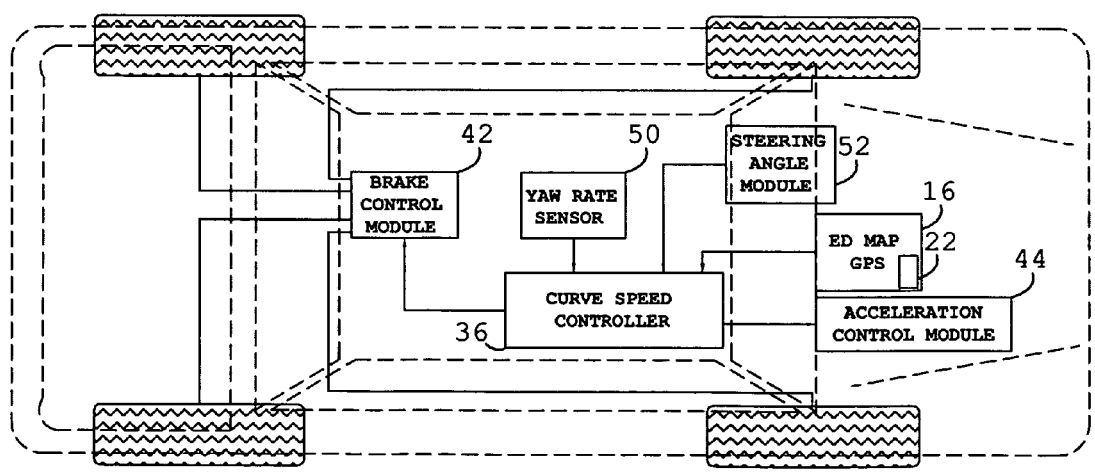
FIG. 2 is an elevation view of a navigation system, vehicle and operator in accordance with a preferred embodiment of the present invention.
Figure 3:
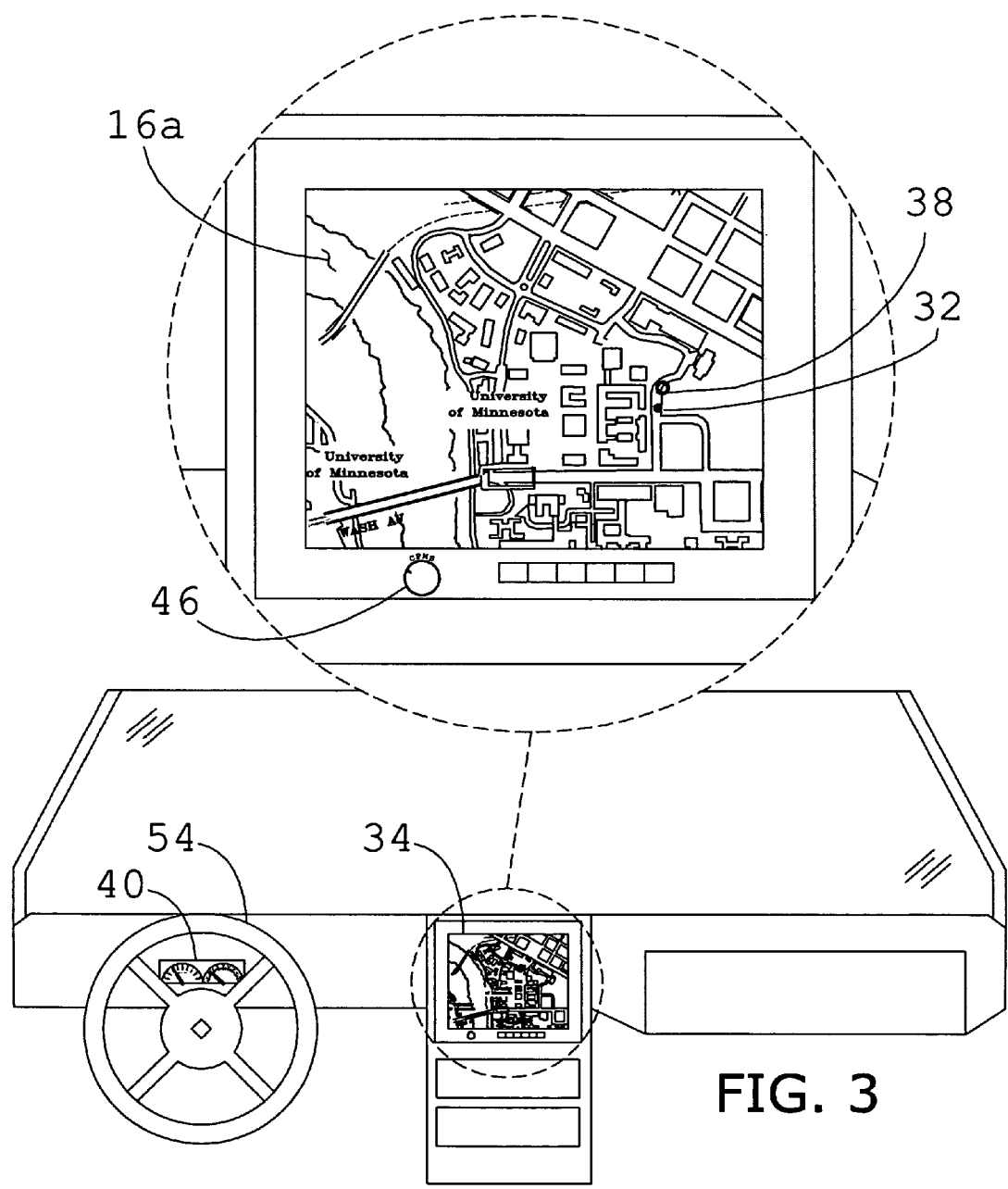
FIG. 3 is an elevation view of the dashboard of the vehicle and navigation system shown in FIG. 2, particularly illustrating the monitor, and map record.

A preferred embodiment of the system 10 includes a database 16 having at least one map record 16a consisting of a plurality of position points, wherein each point corresponds to a location upon the earth or other planetary body (see FIGS. 2 and 3). More preferably, the database 16 includes a plurality of Enhanced Digital (ED) maps using GPS data. The points preferably present a plurality of paths 18, so as to form a road map. At least a portion of the points preferably include ID links that enable correlation between a given point and indicia data corresponding to an actual condition at the corresponding location. More preferably, the indicia data may be inputted, or modified by the operator 14 or a third party. Finally, the database 16 may be stored in the system 10 by conventional storage means, such as a CD-ROM, internal hard disk, or removable memory card.

The system 10 includes a locator device 20 configured to determine the geographic location of the vehicle preferably under a three-dimensional coordinate system. As shown in FIG. 1, a preferred locator 20 determines the longitude, latitude and height coordinates of the vehicle using GPS, and as such, further includes a GPS receiver 22 positioned within the vehicle 12, and at least four mapped satellites 24,26,28,30 communicatively coupled to the receiver 22 at all times. Alternatively, other signal sources located at control points could be communicatively coupled to the receiver 22, and other coordinate systems based on a variety of geodetic datums, units, projections, and references, such as Military Grid Reference System (MGRS) or ECEF X,Y,Z could be utilized in accordance with the present invention. Finally, the locator device 20 is communicatively coupled to the database 16, and the two are cooperatively configured to correlate the actual location of the vehicle 12 to a first position point 32 upon the map record 16a over time. As shown in FIG. 3, the preferred system 10 further includes a monitor 34 that is configured to display the map record 16a and vehicle location to the operator 14.

Figure 4:
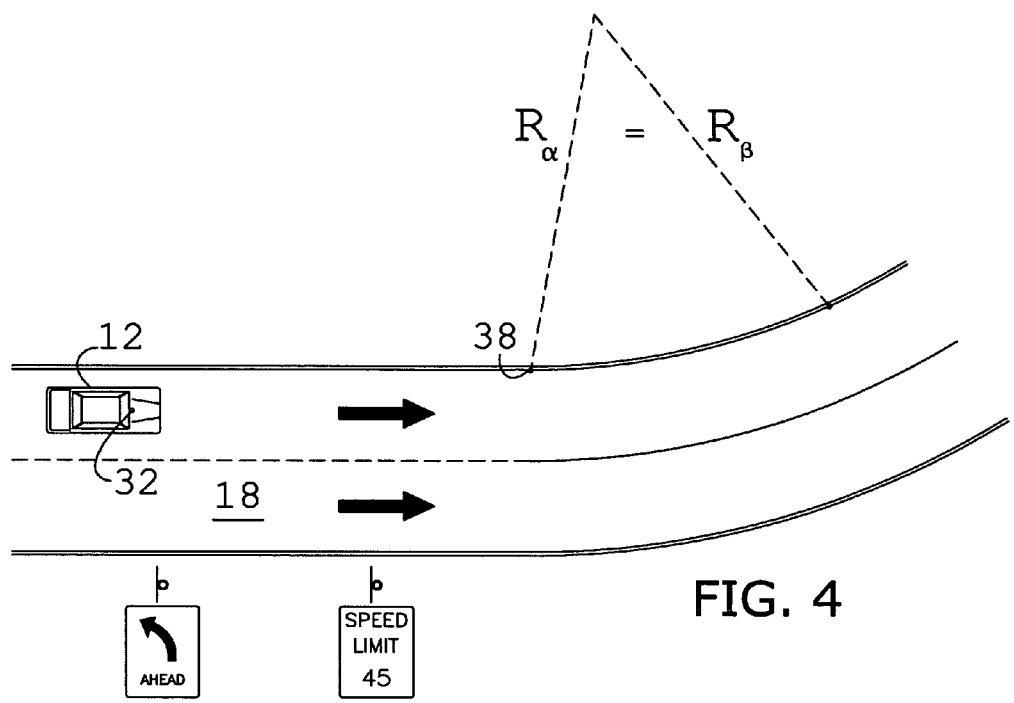
FIG. 4 is a plan view of the vehicle traveling upon a thoroughfare having an approaching circular curve.
Figure 5:
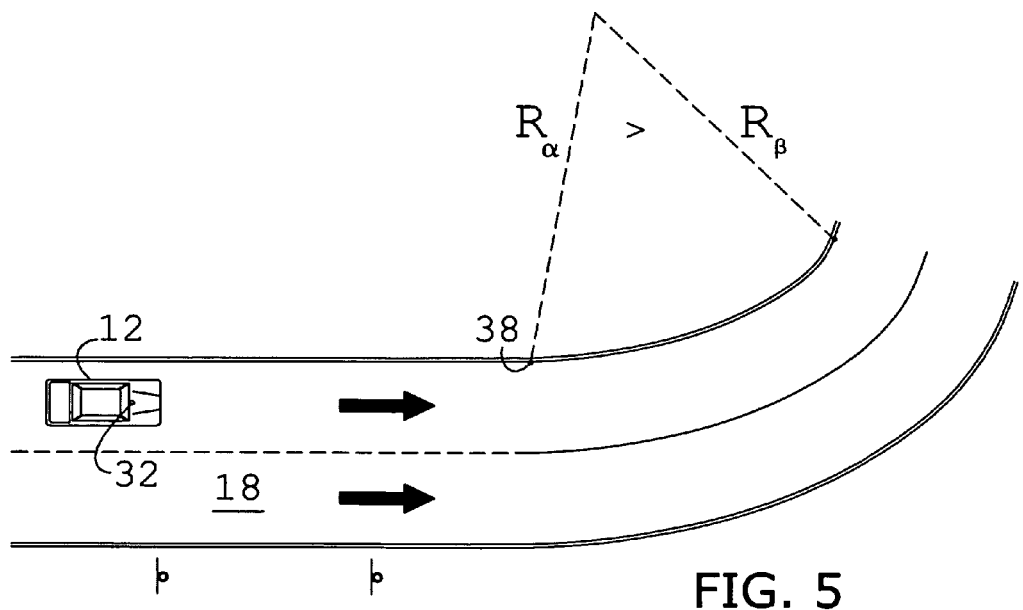
FIG. 5 is a plan view of the vehicle traveling upon a thoroughfare having an approaching non-circular curve.

The system 10 further includes an inventive controller 36 configured to identify an approaching curve 18a within a vehicle path 18, when the vehicle 12 is located a minimum distance from and is traveling towards a first of a plurality of curve points 38. Each curve point 38 is preferably identifiable by indicia data attributed thereto that indicate the design radius of curvature. The beginning of a set of adjacent curve points may be identified according to corresponding station offsets as designed. As shown in FIGS. 4 and 5, the curve 18a may present a circular, non-circular (e.g. spiral), or combination curve. Thus, the preferred system 10 is configured to read the future road geometry information directly from the ED maps.

Alternatively, one of a plurality of methods described by the aforementioned prior art systems, may be utilized to identify a curve point 38. For instance, a curve point 38 may be identified by triangulation of preceding and succeeding points, and by comparing an angle defined by the points with a threshold value. Thus, in this configuration, the controller 36 is configured to initially perform a curve point identification algorithm. It is appreciated, however, that where each positional point along the path is associated with a radius of curvature value, the controller 36 need not be configured to initially identify a particular curve point.

Once a curve point 38 is identified, the controller 36 is further configured to facilitate the proper management of the curve by the vehicle. The controller 36 is configured to determine the current speed, $V_x$, and, more preferably, is communicatively coupled to the speedometer 40 or configured to calculate the speed based on GPS data. The controller 36 is further configured to directly calculate, or retrieve from a table of off-line computations, the desired curve speed profile at the location. Based on the current speed and desired curve speed profile, the controller 36 determines an acceleration profile, and generates an acceleration or deceleration command. Finally, the controller 36 is configured to then receive actual speed feedback, and modify the command accordingly, so as to present a closed loop system that approaches an optimal curve speed.

Figure 6:
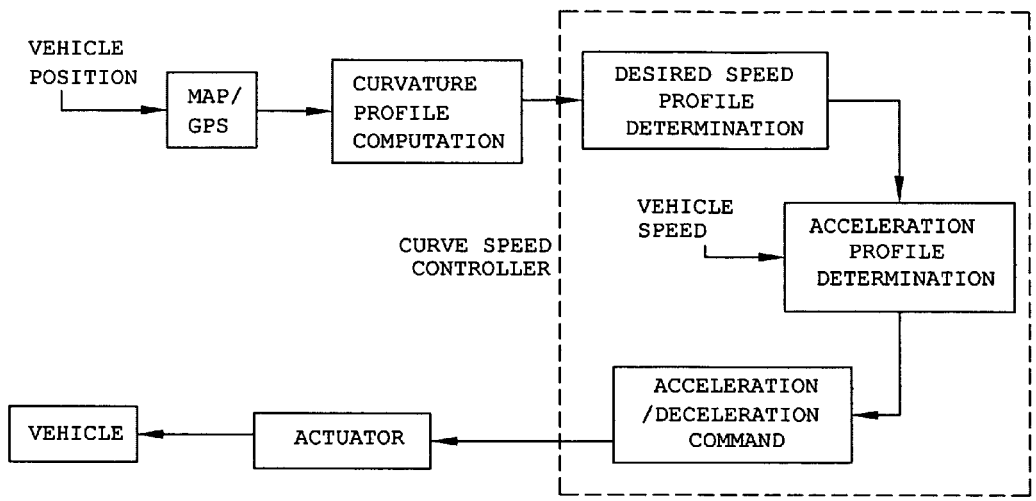
FIG. 6 is a block diagram of a preferred embodiment of curve speed control system in accordance with the present invention.

To autonomously control the curve speed, the preferred controller 36 is communicatively coupled to a brake module 42, and an acceleration module 44 of the vehicle, so as to be able to cause the vehicle 12 to accelerate or decelerate (see FIG. 6). The brake module 42 is preferably configured to receive an electric deceleration command from the controller 36 and mechanically decelerate the vehicle 12, when the current vehicle speed is deemed to be greater than the desired curve point management speed of a curve point. A preferred embodiment of the brake module 42 includes at least one electromechanical valve (not shown) intercoupled with the hydraulic lines of the brakes. In another embodiment, the brake module 42 is configured to bypass or dampen at least a portion of the acceleration components of the vehicle 12, such as the gas pedal, so as to allow wind and engine drag to slow the vehicle 12.

Conversely, the acceleration module 44 is preferably configured to receive an electric acceleration command from the controller 36 and mechanically control at least a portion of the acceleration components of the vehicle 12, when the current vehicle speed is deemed to be less than or equal to the desired curve point management speed. For example, the acceleration module 44 may be interconnected to and configured to modify the performance of an internal combustion engine. More particularly, the acceleration module 44 may be configured to modify the quantity or constituency of the fuel/air mixture. In an electrically driven vehicle, the acceleration module 44 may be configured to regulate the current delivered to the motor.

A preferred embodiment of the inventive algorithms and function of the controller 36 to accomplish these tasks is more particularly described as follows:

I. Allowable Curve Speed Profile

For a plurality of curve points an allowable curve speed profile is initially determined, wherein the controller 36 calculates an allowable or maximum curve point speed, or critical speed, $V_{x\_critical}$ for each point, according to the following formula:

$$V_{x\_critical} = \sqrt{\frac{Rg(\sin\theta + \mu\cos\theta)}{\cos\theta - \mu\sin\theta}},\qquad(1)$$

and, $\theta$ is the bank angle of the curve at the curve point, g is the acceleration due to gravity (9.81 m/s$^2$), R is the radius of curvature of the curve at the curve point, and u is the coefficient of friction between the surface and vehicle at the curve point.

Alternatively, the controller 36 may compute a curvature profile for the approaching curve 18a and use a critical speed database, generated off-line, to obtain the allowable curve speed profile. In this configuration, the controller 36 may retrieve the allowable curve speed profile data from the table, or from previously stored indicia associated with the curve point directly in the map record 16a.

II. Desired Curve Speed Profile

As previously described, an inventive aspect of the present invention is to modify the allowable curve speed profile to determine a desired curve speed profile, based on operator preference and/or vehicular characteristic input. Where the allowable curve point management speed is calculated by equation (1), the input may be represented by at least one variable factor, and more preferably, by the product of an operator (or driver) factor, $K_d$, and a separate vehicular factor, $K_v$. Among other things, the $K_d$ factor may be influenced by the age, vision, comfort level, or otherwise driving style and ability of the driver, as well as the passenger(s) and load weight the vehicle is carrying. The $K_v$ factor may be influenced, among other things, by the center of gravity height, track width, vehicle roll characteristics, composition and configuration of the tires, thoroughfare surface and condition, the posted speed limit, and/or the weight of the vehicle. It is appreciated that these coefficients may be adjusted experimentally based on the driver's acceptance level. Finally, the desired curve point management speed, or comfort speed, is further achieved by replacing the acceleration due to gravity constant with a reduced maximum lateral acceleration factor, $A_y$ (i.e. 0.3 g, for example), so that $$V_{x\_comfort} = K_v K_d \sqrt{\frac{RA_y(\sin\theta + \mu\cos\theta)}{\cos\theta - \mu\sin\theta}}\qquad(2)$$

In more general terms, the desired curve speed can be a function of the following parameters; bank angle, road friction coefficient, road curve radius, vehicle factor and driver factor as shown in the following equation.

$$V_{z\_comfort}=F(R,\theta,\mu,K_v,K_d)\qquad(2A)$$

This calculation is performed for each curve point to determine the desired curve speed profile, wherein said profile is denoted by the matrix:

$$\hat{V}_{x\_desired}=[\hat{V}_x(0)\ \hat{V}_x(1)\ldots\hat{V}_x(N)]\qquad(3)$$

It is appreciated that where the curve 18a is circular, as shown in FIG. 4, and all curve points present equal radii, the desired curve speed profile is constant, and the desired curve point management speed calculated for the first curve point can be utilized for the entire curve.

Where the curve 18a is noncircular (see FIG. 5), the controller 36 determines a separate desired curve point management speed for each of the plurality of curve points, to generate the desired curve speed profile. Curve point sampling is preferably performed at a predetermined interval, such as 150 m, that depends in part upon the length of the curve 18a. More preferably, the interval is modifiable by the operator 14, so as to increase accuracy or decrease involvement where desired. Finally, similarly to the allowable curve point management speed, the desired curve point management speed for a given point may be retrieved from a pre-generated table of computed values.

III. Vehicle Position Determination

It is appreciated that accurate vehicle positioning is necessary to effect the proper function of the system 10. Using equation (2) or a desired curve point management speed lookup table to determine speed, and the current vehicle position in the global coordinate, the preferred controller 36 is configured to generate a desired position profile over time, as follows:

$$d_{desired}=[d(0)\ d(1)\ldots d(N)]=[0d\ldots Nd]\qquad(4)$$

The desired position profile corresponds to the curve speed profile point in Equation (3), wherein d is the step for each equidistance curve point. However, it is appreciated that the controller 36 will function correctly even for non-equidistant points. Where GPS information becomes unreliable, however, i.e. amongst tall bridges, buildings or other obstacles, the system 10 preferably includes an estimation module later described in part (VI).

IV. Acceleration Profile

The acceleration or deceleration command is generated based on the current vehicle speed, $V_x$, and the desired curve speed profile. For the profiles of desired speed as shown in Equation (3) and vehicle position shown in Equation (4), the acceleration profile in the vehicle fixed coordinate can be computed for a given curve point, i, according to the following formula:

$$\hat{a}_x(i) = \frac{\hat{V}_x(i)^2 - V_x^2}{2d(i)} \quad (5)$$

where $d(i)=(i-1)d$ is the distance to the desired velocity point of the curve from the current position. Thus, for a given plurality of curve points, the desired curve speed profile, current vehicle speed and sampling distance is utilized to determine the acceleration profile:

$$\hat{A}_{x\_desired} = [\hat{a}_x(0) \; \hat{a}_x(1) \ldots \hat{a}_x(N)], \quad (6)$$

V. Curve Speed Command

Figure 7:
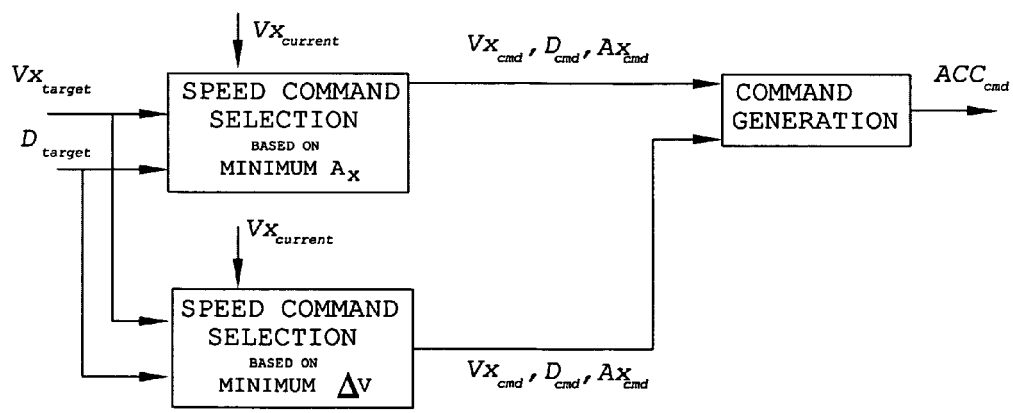
FIG. 7 is a block diagram of a preferred embodiment of a curve command generation module, in accordance with the present invention.

As shown in FIG. 7, an optimal curve speed (i.e. $Vx_{cmd}$, $D_{cmd}$, $Ax_{cmd}$) is achieved by applying either a minimum speed difference (at anticipated conventional vehicle speeds), or a minimum acceleration/deceleration rate (where the vehicle is incapable of effecting the speed differences over the given distance between curve points) control, wherein the minimum speed difference is the difference between the desired curve point management speed and an estimated optimal speed for a given curve point. The acceleration command is selected for the minimum value from the desired acceleration profile (6). In other embodiment, the difference is used, along with a carefully tuned weighting factor, to modify the command. More preferably, the acceleration command is determined from the minimum difference, according to the following formula and algorithms:

$$V_x(i) = V_x(0) + A_x \times \Delta t \times i \quad (7)$$

$$W = [\, w(o) \; w(1) \; \ldots \; w(N) \,] \quad (8)$$

$$J = \sum_{i=1}^{N} \{\hat{V}_{x\_target}^2 - V_x(i)^2\} w(i) \quad (9)$$

$$A_x = \frac{\sum_{i=1}^{N} \{\hat{V}_{x\_target}^2 - V_x(i)^2\} w(i) \times i}{2 \sum_{i=1}^{N} w(i) \times i^2} \quad (10)$$

Formula (7) provides a preferred method of determining the estimated speed with acceleration $A_x$ over a measure of time. Matrix (8) provides a congruent weight vector for use in calculations. Formula (9) provides a preferred method of determining a performance index for each curve point, i, from 1 to N, based on the difference between the desired (i.e. target) speed and the estimated speed, multiplied by the weighting factor at the given point. Finally, by partial differentiating formula (9) with respect to $A_x$, the optimal command can be generated from formula (10). Formula (10) provides a preferred method of determining the optimal acceleration rate, $A_x$, such that the change of the performance index over the change in optimal acceleration rate is zero.

It is appreciated that using a control loop towards achieving an optimal curve speed profile, as opposed to an individual curve point analysis, provides significant improvements to operator comfort and safety by reducing abrupt braking and rapid acceleration from point to point. Where large differences in adjacent curvature radii exist, as commonly found at curve termination points, the optimal acceleration profile may further reduce the likelihood of errors, failures, and/or accidents.

Alternatively, the desired curve speed profile, command, and optimal speed profile may be generated directly from the allowable curve speed profile, where other operator-controlled means are provided for damping the command signal. For example, a control dial 46, as shown in FIG. 3, may be provided for reducing the amplitude, but not the period or cycle of the generated acceleration/deceleration command prior to receipt by the modules 42,44. As the dial 46 is turned towards the least responsive setting, the system 10 effects a lower speed at the curve points, while maintaining proper positioning.

VI. Positioning Estimation Module

In another aspect of the system 10, the controller 36 preferably includes an estimation module 48 that enables the vehicle 12 to estimate a future location and vehicle speed, based on a current condition of the vehicle 12, such as the current vehicle speed, steering angle, yaw rate, or a combination thereof. In the illustrated embodiment, the system 10 includes a yaw rate sensor 50 connected to the vehicle 12 and operable to sense the yaw rate, i.e. rate of rotation, of the vehicle, and a steering angle module 52 having a sensor (see FIG. 1). The steering angle module 52 is configured to detect and communicate to the controller 36 the current degree of clockwise rotation of the steering wheel 54 (see FIG. 3), wherein zero degrees represents and may be calibrated by the steering wheel position during travel upon a generally straight portion of the path 18.

Figure 8:
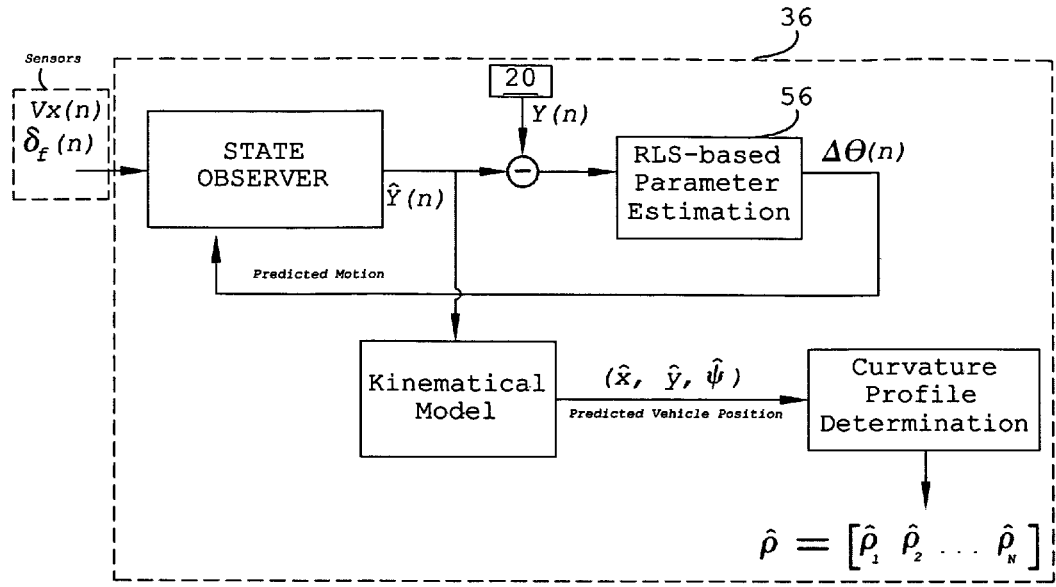
FIG. 8 is a block diagram of a preferred embodiment of a vehicle position estimation module, in accordance with the present invention.

More preferably, and as shown in FIG. 8, the current velocity, $V_x$, and steering angle, $\delta_f$, are recognized by the controller 36 and used to determine a future location, $Y(n)$, of the vehicle 12 at a time, n. At time n, the sensors 50,52 and the locator device 20 provide the actual location of the vehicle $Y_x$. The difference between actual and estimated locations of the vehicle 12 provides a measure of error, $\Delta Y(=Y(n)-Y_x)$, which is compared to a threshold control value in an RLS-based parameter estimation sub-module 56 routine.

VII. System Feedback and Control

Where the difference $\Delta Y$ exceeds the threshold, the estimation module 46 is modified, so as to provide a close-looped feedback control system. Where the difference $\Delta Y$ is within threshold values, the module 46 provides accurate means for predicting vehicle positioning in a kinematical model. The controller 36 and sensors. 50,52 are also configured to provide constant vehicle speed feedback in modifying the command to achieve the optimal curve speed. In other words, the preferred controller 36 is configured to compare the actual vehicle speed at the curve point 38 to the previously determined desired curve point speed, and modify the acceleration/deceleration command based on the revised current speed for the given curve point.

Another usage of the sensor information is to activate and deactivate system performance without interfering with the control of the vehicle by the operator 14. In a preferred embodiment, when the vehicle 12 is within a predetermined period (for the current vehicle speed) from the first curve point 38 of an approaching curve 18a, the system 10 is automatically activated. The system 10 may also be configured to operate upon demand either through visual, audio or haptic means (such as accelerator pedal force feedback). For example, a voice request/voice response or button press/voice response mechanism may be actuated by the operator 14, when curve management assistance is desired. The preferred acceleration and deceleration rates can either be programmed into the system 10 as a calibration constant off-line, or more preferably, inputted and modified by the operator 14.

Figure 9:
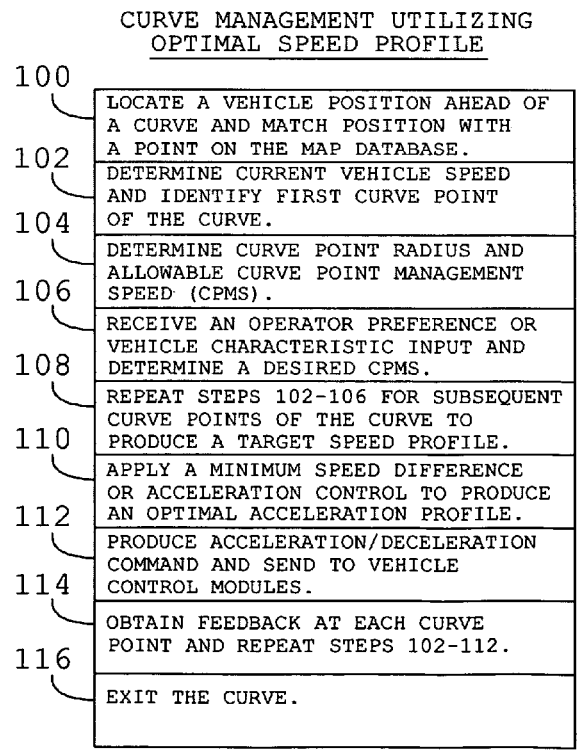
FIG. 9 is a flow diagram of a preferred method of curve management, in accordance with the present invention.

Thus, a preferred method of curve management by a vehicle including a navigation system having a map database, performed by a controller, includes at a first step 100 positioning the vehicle in the database (see FIG. 9) ahead of an approaching curve 18*a*. At a second step 102, the current vehicle speed is determined and a first approaching curve point of the curve is identified. At a third step 104, a curve point radius and an allowable curve point management speed are determined for the approaching curve point. Once the allowable curve point management speed is determined, and at a step 106, an operator preference or vehicle characteristic input is further received to determine a desired curve point management speed.

At a step 108, the desired curve point management speed is stored for a sufficient period, and steps 102 through 106 are repeated for a plurality of succeeding curve points, so as to determine a desired curve speed profile for the curve 18*a*. At a step 110, an acceleration profile is determined based on the desired curve speed profile and the current speed of the vehicle. At a step 112, an acceleration command is generated, and delivered to either a brake or acceleration module. At a step 114, the actually achieved vehicle speed at a curve point is fed back to the controller, and a minimum difference or minimum acceleration control, along with tuned weighting factors are used to continuously update the acceleration/deceleration command, in order to achieve an optimal curve speed. Finally, at a step 116, the method repeats from step 110 at a succeeding curve point, until the method terminates by exiting the curve 18*a*.

The preferred forms of the invention described above are to be used as illustration only, and should not be utilized in a limiting sense in interpreting the scope of the present invention. Obvious modifications to the exemplary embodiments and methods of operation, as set forth herein, could be readily made by those skilled in the art without departing from the spirit of the present invention. The inventors hereby state their intent to rely on the Doctrine of Equivalents to determine and assess the reasonably fair scope of the present invention as pertains to any system or method not materially departing from but outside the literal scope of the invention as set forth in the following claims.

What is claimed is:

1. A speed control system adapted for use with a vehicle having a steering wheel and operator, said system comprising:
    a map database having at least one record, wherein the record presents at least one path, said path presenting a plurality of position points, wherein a portion of the points present adjacent curve points that define a curve;
    a locator device communicatively coupled to the database, and configured to determine the location of the vehicle and match the location with a first of said points on the path, when the vehicle is located on the path;
    a controller communicatively coupled to the device and database, and configured to identify an approaching curve point and determine an allowable curve point management speed; and
    a steering angle module communicatively coupled to the controller, and configured to determine and communicate to the controller the current degree of rotation of the steering wheel,
    said controller being configured to determine a desired curve point management speed based in part on the allowable curve point management speed and an operator preference or vehicle characteristic input, and further configured to determine the current vehicle speed,
    said controller including an estimation module configured to estimate a future condition of the vehicle based on the current vehicle speed and degree of rotation, and presenting a closed loop system, wherein the controller is configured to compare the estimated future condition to the corresponding actual future condition, and modify the estimation module accordingly.

2. The system as claimed in claim 1,
    said database including an allowable curve point management speed table, wherein each curve point is associated with an allowable curve point management speed,
    said controller being further configured to retrieve the associated curve point management speed from the table.

3. The system as claimed in claim 1; and
    a brake module communicatively coupled to the controller, and configured to decelerate the vehicle upon command,
    said controller being further configured to achieve the current vehicle speed, and send a deceleration command signal to the brake module, when the current speed is greater than the desired curve point management speed.

4. The system as claimed in claim 1; and
    an acceleration module communicatively coupled to the controller, and configured to accelerate the vehicle upon command,
    said controller being further configured to determine the current vehicle speed, and send an acceleration command signal to the acceleration module, when the current speed is less than the desired curve point management speed.

5. The system as claimed in claim 4,
    said vehicle including an internal combustion engine having a fuel intake,
    said acceleration module being communicatively coupled to and configured to modify the fuel intake, so as to modify the amount or constituency of the fuel consumed by the engine.

6. The system as claimed in claim 1,
    said controller being actuated utilizing a voice request/voice response or button press/voice response mechanism.

7. A method of vehicular curve management by a controller, wherein the vehicle includes a navigation system having a map database, said method comprising the steps of:
    a) accessing and locating the current position of the vehicle upon a path in the database;
    b) identifying a plurality of approaching curve points of a curve on the path;
    c) determining a curve point radius and an allowable curve point management speed for each of said points, so as to determine an allowable curve speed profile; and
    d) receiving an input relating to an operator preference or vehicle characteristic, and determining a desired curve point management speed for each of said points based on the allowable curve point management speed and input, so as to determine a desired curve speed profile for said plurality of approaching curve points.

8. The method as claimed in claim 7, wherein the allowable curve point management speed, $V_{x\_critical}$, is calculated according to the equation:

$$V_{x\_critical} = \sqrt{\frac{Rg(\sin\theta + \mu\cos\theta)}{\cos\theta - \mu\sin\theta}},$$

with θ being the bank angle of the curve at the curve point;
    g being the acceleration due to gravity (9.81 m/s$^2$);

R being the radius of curvature of the curve at the curve point; and

μ being the coefficient of friction between the surface and vehicle at the curve point.

9. The method as claimed in claim 7, wherein the desired curve point management speed, $V_{x\_comfort}$, is calculated by the controller as a function of a vehicle characteristic or operator preference factor, a maximum lateral acceleration rate, the radius of curvature, and the coefficient of friction between the surface and vehicle at the curve point.

10. The method as claimed in claim 9, wherein the desired curve point management speed, $V_{x\_comfort}$, is calculated according to the equation:

$$V_{x\_comfort} = K_v K_d \sqrt{\frac{RA_y(\sin\theta + \mu\cos\theta)}{\cos\theta - \mu\sin\theta}},$$

with $A_y$ being an desired lateral acceleration rate;

$K_v$ being a desired factor pertaining to vehicular characteristics ; and $K_d$ being a desired factor pertaining to operator preference.

11. The method as claimed in claim 7; and (e) determining the current vehicle speed and position, and an acceleration profile, and generating an acceleration/deceleration command based on the acceleration profile and current speed.

12. The method as claimed in claim 11, step (e) further including the steps of delivering the command to an acceleration or brake module, so as to automatically accelerate or decelerate the vehicle.

13. The method as claimed in claim 11; and (f) receiving speed and positioning feedback, utilizing a control loop, and modifying the command, to achieve an optimal curve speed.

14. The method as claimed in claim 11, wherein the acceleration or deceleration command is modified to achieve the optimal curve speed based on a minimum acceleration or deceleration rate.

15. The method as claimed in claim 11, wherein the acceleration or deceleration command is modified to achieve the optimal curve speed based on a minimum speed differential.

16. The method as claimed in claim 15, wherein the acceleration or deceleration command is modified to achieve the optimal curve speed, in accordance with the following algorithm:

$$A_x = \frac{\sum_{i=1}^{N} \{\hat{V}_{x\_target}^2 - V_x(i)^2\} w(i) \times i}{2\sum_{i=1}^{N} w(i) \times i^2}$$

wherein $V_{x\_target}$ is the desired curve speed at a given curve point i, $V_x(i)$ is a pre-determined estimated curve speed at the point, and w(i) is a weighting factor at the point.

* * * * *